June 12, 1951  R. J. HEGNER  2,556,620
MACHINE FOR TEACHING PERSPECTIVE DRAWING
Filed Dec. 8, 1948  2 Sheets-Sheet 1

Richard J. Hegner
INVENTOR.

BY *Clarence A. O'Brien*
*and Harvey B. Jacobson*
Attorneys

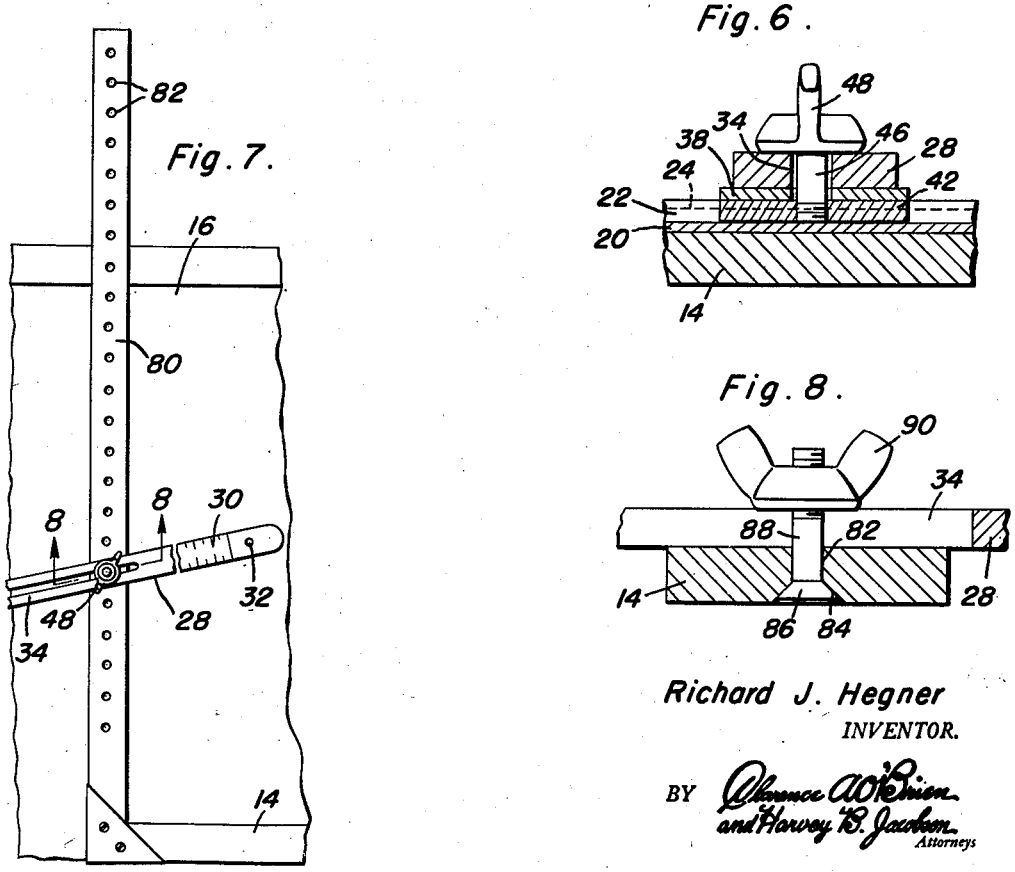

Patented June 12, 1951

2,556,620

UNITED STATES PATENT OFFICE 2,556,620

MACHINE FOR TEACHING PERSPECTIVE DRAWING

Richard J. Hegner, Newberg, Oreg.

Application December 8, 1948, Serial No. 64,194

2 Claims. (Cl. 33—77)

This invention comprises novel and useful improvements in a machine for teaching perspective drawing and more specifically pertains to a drafting appliance for facilitating accurate production of perspective drawings and for facilitating the rapidity of such production.

The primary object of this invention is to provide a drafting appliance which will permit the accurate and rapid production of perspective drawings, and will particularly facilitate the directing of lines from proper vanishing points and for varying these vanishing points with ease and rapidity as desired during the construction of a drawing.

The principal feature of this invention comprises the provision of a drafting apparatus having a frame provided with a pair of parallel guide tracks, a pair of arms each having a straight edge and each slidably secured to a guide track by means of a pivot adjustable upon said track, positioning the arm at various locations, while permitting free pivotal and sliding movement of the arm about its pivot.

A further important feature of the invention resides in connecting each arm to the supporting slide for both longitudinal and pivotal movement upon the slide, together with locking means for securing the arm in predetermined longitudinal position upon the slide without interfering with the rotational and sliding movement of the arm.

Yet another feature of the invention resides in a novel construction of a track and slide construction together with means for adjustably positioning the arm upon the slide without interfering with movement of the slide upon the track.

An additional important feature of the invention comprehends the provision of a hinged connection between the ends of two arms, whereby intersection of drafting lines extending from different vanishing points may be readily obtained.

And a final important feature and object of the invention to be specifically enumerated herein, resides in the provision of an apparatus which shall be of lightweight, simple and inexpensive construction, yet sturdy, durable and dependable for the purposes intended.

These, together with various ancillary features and objects of the invention which will later become apparent as the following description proceeds, are attained by this device, preferred embodiments of which have been illustrated, by way of example of the principles of the invention, in the accompanying drawings, wherein:

Figure 3 is a vertical longitudinal sectional view taken substantially upon the plane of the broken section line 3—3 of Figure 2 and illustrating the construction and attachment of the hinged connection to the ends of the two arms in the arrangement shown in Figure 2;

Figure 4 is a vertical longitudinal sectional detail view taken substantially upon the plane of the section line 4—4 of Figure 2 and illustrating the attachment of the arm to the slide for free movement thereon, together with the securing of the slide to the guiding track of the device;

Figure 5 is a vertical transverse sectional detail view taken substantially upon the plane of the section line 5—5 of Figure 1 showing the construction of a guide track and the manner of attaching the same to the frame of the apparatus;

Figure 6 is a vertical transverse sectional detail view taken substantially upon the plane of the section line 6—6 of Figure 4 and showing further details of construction of the slide, arm and track connection means;

Figure 7 is a fragmentary top plan view of a portion of the framework of a modified form of drafting appliance incorporating the principles of the invention; and, Figure 8 is a vertical transverse sectional detail view taken substantially upon the plane of the section line 8—8 of Figure 7 and showing the modified connecting means of the arm and frame in accordance with this embodiment of the invention.

Figure 1:
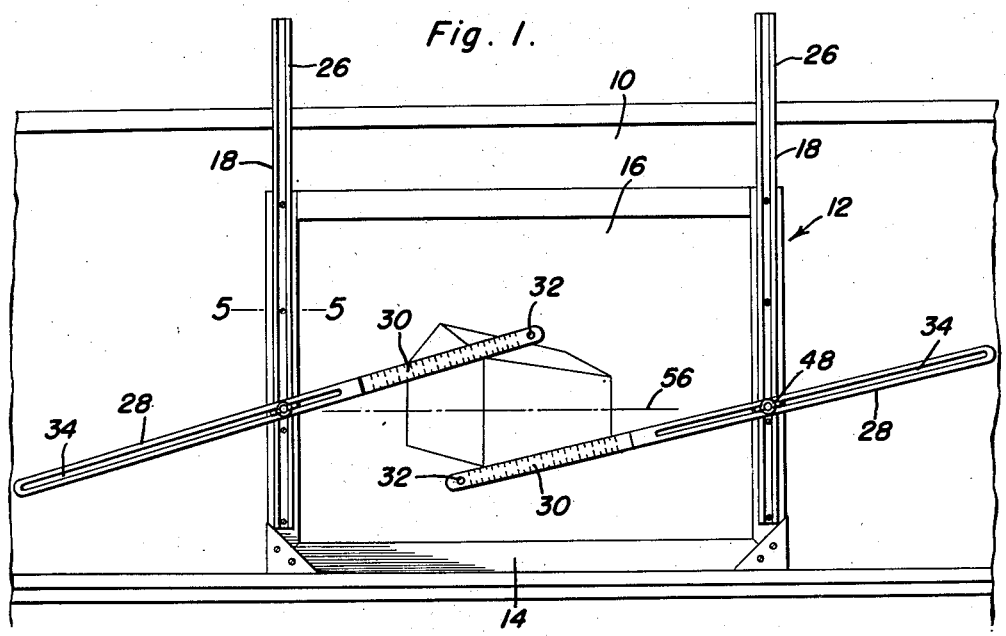
Figure 1 is a plan view, showing a preferred embodiment of the drafting appliance, the straight edge arms being positioned for independent operation in producing lines from vanishing points.
Figure 2:
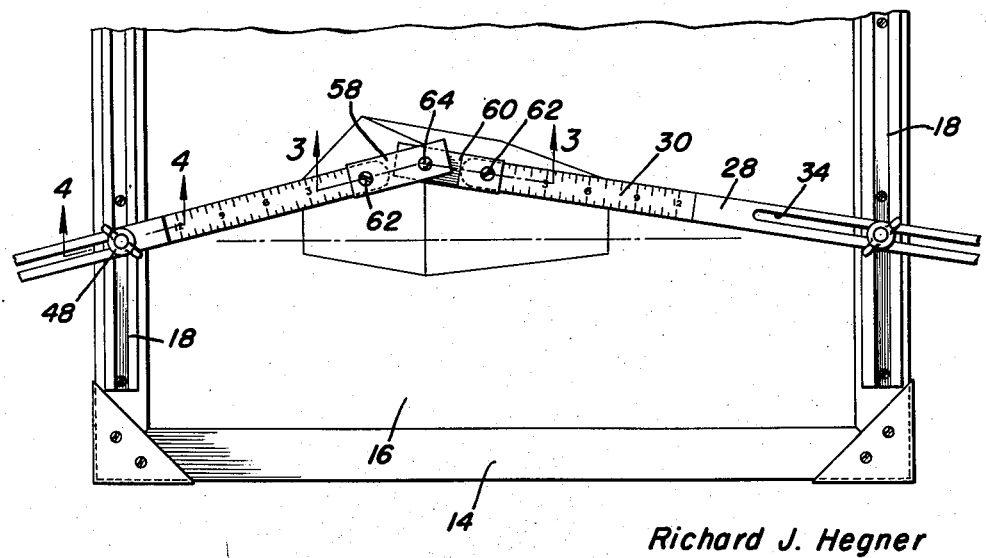
Figure 2 is a fragmentary plan view, upon an enlarged scale, of the arrangement of Figure 1, but showing the arms pivotally connected together for producing intersecting lines from different vanishing points in accordance with the invention.

Referring now more specifically to the embodiment of Figures 1-6 of the accompanying drawings, wherein like numerals designate similar parts throughout the various views, it will be seen that numeral 10 designates a supporting surface which may be part of a table, blackboard or any other supporting surface adapted to receive the apparatus forming the subject of this invention and designated generally by the numeral 12.

This apparatus preferably comprises a removable frame 14 to encompass a drawing board which in turn will hold a sheet of drawing paper, or a drafting board or other suitable supporting surface 10 for the reception of drafting paper 16 or other material upon which a perspective drawing is to be prepared.

Secured to the frame or board 14 and preferably adjacent the side edges of the same, are a pair of guide tracks 18, which as shown in Figure 5 are preferably formed as channel members having a bottom wall 20, and upwardly extending marginal side walls 22 which at their upper ends are provided with outwardly and laterally extending marginal flanges 24 which are thus spaced vertically above the frame 14 which forms a supporting frame for the guide tracks.

The guide tracks 18 are preferably extended considerably beyond the edge of the board 14, as at 26, in order that lines may be drawn from vanishing points which are remote from the board 14.

It should be here noted that the board 14, the lengths of the guide tracks 18, and the spacing of the same may be varied as desired and in accordance with the type of drafting with which the instrument is to be employed.

A pair of arms 28 are provided, each arm defining or comprising a straight edge which is mounted upon one of the tracks 18 for longitudinal sliding movement thereon, for pivotal movement about its connection with the track, and for sliding or longitudinal movement about its pivot point. By this means, the arm may be extended or positioned as desired upon the sheet 16 whereby any desired line may be drawn in any direction thereon.

One end of each arm 28, which may be termed the inner end thereof may be provided with suitable indicia 30 to facilitate measuring or drawings to scale. Further, at their inner ends, the arms 28 are provided with apertures 32 by means of which the inner ends of the arms may be hinged together for a purpose and in a manner to be subsequently set forth.

At their outer ends, and preferably throughout a major portion of their length, the arms 28 are provided with longitudinally extending slots 34 whereby the arms may be slid longitudinally upon their pivotal connections as set forth hereinafter.

As will be more readily apparent from Figures 4 and 6, a slide 36 is provided for connecting each arm with the guide track 18. This slide preferably consists of a plate-like member 38 which overlies the flanges 24 of the track, which plate is provided with inturned lateral flanges 40 adapted to overlie and embrace with the plate the lateral flanges 24 of the track, whereby the slide may be slid longitudinally of the track but is retained by the cooperating flanges against lateral movement thereon or withdrawal therefrom except endwise of the track.

In order to pivotally and adjustably retain the arm upon the slide, a block 42 of any suitable dimensions is provided for reception in the channel of the track between the side walls 22 thereof, and below the plate 38 of the slide, and by means of an aperture 44 in the plate 38 of the slide a screw threaded shank 46 of a wing bolt 48 is screw threadedly engaged into the slide block 42. This bolt extends through the previously mentioned longitudinal slot 34 of the arm 28.

If desired, as shown in Figure 4, the outer end and major portion of the arm 28 may be offset from the inner portion which carries the scale or indicia 30, so that the latter may lie flat upon the drawing surface or material 16 and whereby this offset portion gives sufficient clearance to accommodate the thickness of the raised track supporting frame 14.

By reference to Figure 4, it will now be seen that the member 46 and its slide 38 are slidable longitudinally of the track 18 and may be clamped thereto at any position by merely screwing the member 46 through the slide block 42. This causes the end of the screw 46 to abut the bottom 20 of the track, whereby the block 42 travels upwards upon the screw threads and lifts with it the slide 38. This causes the flanges 40 of the latter to press upwardly upon flanges 24 of the tracks thereby locking slide and track.

It will be noted that the wing portion 48 does not clamp the arm 28 rigidly to the slide 38 but permits free pivoting of the arm upon pivot 46 while the latter is clamped in longitudinally adjusted position upon the track 18.

The track itself may be secured in any desired manner to the board 14, but the means shown in Figure 5 is deemed to be preferable. For this purpose, the board 14 is provided with a counterbored aperture in which is received an internally threaded bushing 52, whose flanged closed end 53 is received in the counterbore, and its other extremity terminates flush with the surface of the board 14. Suitable screws 54 extend through apertures in the bottom wall 20 of the track, and into the internally threaded bushing 52, for thereby clamping the track to the board 14.

As thus far described, the operation and utility of the apparatus will be readily understood. The pivot connection of the arm with its slide constitutes an adjustable vanishing point for drawing lines for perspective drawings, and it will be seen that this vanishing point may be adjusted by moving the slide longitudinally of its guide track 18, whereby a vanishing point may be chosen upon the surface 16 or exterior thereto as upon the extensions 26 of the guide tracks. In the arrangement shown in Figure 1, the line 56 indicates an eye level line upon which may be positioned the right and left hand vanishing points of the pivots of the two slides. Alternatively of course, one or the other slide may be shifted to position the arm for drawing lines from different vanishing points as desired.

In some instances it may be preferred to connect the two arms for drawing intersecting lines from different vanishing points. For this purpose, a pivotal connection or hinged connection shown in Figures 2 and 3 may be provided. This connection comprises a pair of members indicated generally at 58 and 60, which are detachably connected as by fasteners 62 extending through the previously mentioned apertures 32 at the inner ends of the arms 28, with said arms. The members 58 and 60 may take different forms as desired, but preferably in the interest of compactness, are received one within the other and secured together as by a hinge or rivet 64. Thus, the two arms which are rigidly attached to the members 58 and 60 are hinged to each other by the pivot 64 to enable the drawing of intersecting lines from predetermined vanishing points.

Conveniently, each of the members 58 and 60 consists of a pair of parallel plates or blades, the member 58 thus providing the blades 66 and 68, while the member 60 includes the blades 70 and 72. One set of blades, such as those of the member 58 may be flat and disposed in parallel relation, while the other set of blades will be provided with angulated portions connecting parallel terminal portions 74 and 76 for snug, sliding reception within and between the blades of the member 58.

The above described embodiment which is the preferred application of the principles of the invention is designed to permit very accurate drafting, by reason of the offset portion of the arms 28 which permits the straight edges of the same to lie flat upon the work, by means of the provision for a complete and easy adjustment throughout the entire range of movement of the slide.

However, in some instances it may be preferred to resort to a simplified and more economical construction, which however is not capable of as extreme a range of adjustability as the preceding form. For this purpose, the appliance may include the construction shown in Figures 7 and 8, wherein the track has been eliminated and replaced by strips 80 provided with a plurality of longitudinally spaced apertures 82, this strip 80 which constitutes means for adjusting the vanishing points of the arms, also extending beyond the confines of the board 14 and of the drawing surface 16 thereon, as shown in Figure 7.

The arms 28 employed with this arrangement, are identical in every respect with the arms of the preceding embodiment except that if desired the offset portion may be omitted, the arms thus forming straight edges, having the above mentioned scale indicia 30 thereon, and if desired may be provided with the apertures 32 for the reception of the hinged connecting means, if the use of the same is desired. The arms further include the longitudinally extending slots 34 by means of which the arms may be pivotally and slidably secured to pivots carried by any selected aperture 82.

As shown in Figure 8, the undersurface of the track 80 is provided with a countersunk portion 84 for each of the apertures 82, whereby the recessed head 86 of a bolt 88 may be snugly accommodated therein, this bolt 88 thus extending through the slot 34 of the arm 28 and being provided with a wing nut 90.

In this arrangement, in order to vary the vanishing point of the lines, it is necessary to remove the bolts 88, and insert the same in a different aperture 82. However, by merely loosening the wing nut 90 it is possible to vary the angular position or pivotal movement of the arm 28 about the bolt 88, as well as to permit sliding movement of the arm upon the bolt as in the previous embodiment.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus described the invention, what is claimed as new is as follows:

1. A perspective drafting apparatus including a frame having a pair of parallel tracks, an arm provided with a slot and mounted in each of said tracks for pivotal and longitudinal movement and adapted to be pivotable when in longitudinally adjusted position, said tracks being formed of channel members having bottom walls, upwardly extending side walls and outwardly extending marginal flanges integral therewith, a block having a tapped hole therethrough positioned on each of said bottom walls and directly beneath said slotted arm, an apertured plate member having inturned flanges overlying said marginal flanges of each of said tracks and positioned so that said aperture and said tapped hole are in alignment, a screw positioned with its shank portion passing through each of said slots and apertures and threadedly engaging said block and adapted upon being screwed to abut said bottom of said track whereby said block travels upwardly on said screw and carries said inturned flanges on said plate member upwardly against said marginal flanges thereby locking said arm in longitudinal position and permitting pivotal and sliding movement of said arm with respect to said screw.

2. The combination of claim 1 in which each of said arms is provided with a pair of plates, said plates of one said arm secured within said plates of the other of said arms by a rivet for pivotal movement.

RICHARD J. HEGNER.

REFERENCES CITED

The following references are of record in the file of this patent:

UNITED STATES PATENTS

| Number | Name | Date |
|---|---|---|
| 375,049 | Couglin | Dec. 20, 1887 |
| 795,065 | Ring | July 18, 1905 |
| 970,918 | Grove | Sept. 20, 1910 |
| 1,042,981 | Sherer | Oct. 29, 1912 |
| 1,115,333 | Pease | Oct. 27, 1914 |
| 2,149,783 | McAlister | Mar. 7, 1939 |

FOREIGN PATENTS

| Number | Country | Date |
|---|---|---|
| 302,299 | Germany | Dec. 13, 1917 |